(12) United States Patent
Methar et al.

(10) Patent No.: US 8,261,121 B2
(45) Date of Patent: Sep. 4, 2012

(54) COMMAND LATENCY REDUCTION AND COMMAND BANDWIDTH MAINTENANCE IN A MEMORY CIRCUIT

(75) Inventors: Tukaram Shankar Methar, Goa (IN); Balajee Vamanan, Lafayette, IN (US); Sreenivas Krishnan, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 253 days.

(21) Appl. No.: 12/646,980

(22) Filed: Dec. 24, 2009

(65) Prior Publication Data

US 2011/0161713 A1 Jun. 30, 2011

(51) Int. Cl.
G06F 1/12 (2006.01)
(52) U.S. Cl. ........ 713/400; 713/500; 713/503; 711/125; 711/167; 711/168; 711/169
(58) Field of Classification Search .................. 713/400, 713/500, 503; 711/125, 126, 167, 168
See application file for complete search history.

(56) References Cited

U.S. PATENT DOCUMENTS

| 5,301,295 | A  | * | 4/1994  | Leary et al.    | 711/125 |
|-----------|----|---|---------|-----------------|---------|
| 7,133,991 | B2 | * | 11/2006 | James           | 711/167 |
| 7,251,714 | B2 | * | 7/2007  | James           | 711/167 |
| 2005/0216677 | A1 | * | 9/2005  | Jeddeloh et al. | 711/150 |
| 2006/0022724 | A1 | * | 2/2006  | Zerbe et al.    | 327/141 |
| 2006/0136683 | A1 | * | 6/2006  | Meyer et al.    | 711/154 |

* cited by examiner

Primary Examiner — Nitin Patel
(74) Attorney, Agent, or Firm — Raj Abhyanker, P.C.

(57) ABSTRACT

A method includes operating an arbitration logic of a memory controller at a core clock frequency lower than that of a memory clock frequency. The memory controller is configured to generate a command sequence including a number of commands in accordance with a number of external requests to access the memory. The method also includes parallelizing the number of commands in the command sequence based on a timing requirement for a non-first command in the command sequence defined by a memory-access protocol being satisfied at a rising edge or a falling edge of the core clock relative to a previous command in the command sequence. Further, the method includes ensuring, through the parallelizing, availability of the number of commands in the command sequence to a memory interface operating at the memory clock frequency at a command rate equal to the memory clock frequency.

20 Claims, 6 Drawing Sheets

COMMAND LATENCY REDUCTION AND COMMAND BANDWIDTH MAINTENANCE IN A MEMORY CIRCUIT

FIELD OF TECHNOLOGY

This disclosure relates generally to memory circuits and, more particularly, to a method, an apparatus, and a system for reducing command latency and maintaining command bandwidth in a memory circuit.

BACKGROUND

A memory controller may be a passive circuit that controls a main memory (e.g., Dynamic Random Access Memory (DRAM)). The memory controller may control a flow of data from/into the DRAM, and also may periodically "refresh" the DRAM. For the purpose of controlling data flow, the memory controller may include the requisite logic to read from the memory and/or write into the DRAM.

The source of commands associated with the abovementioned read/write processes may be a Central Processing Unit (CPU) request, a Direct Memory Access (DMA) request, a Graphics Processing Unit (GPU) request etc. These commands may require tough arbitration because, for example, to perform a read/write operation, a memory page may have to be activated/closed based on a conflict thereof. Selection may have to be done between the aforementioned command sources (or memory clients) as to which command (e.g., ACTIVATE, PRECHARGE) may have to be placed on a bus first. Thus, the memory controller may become logic intensive.

The logic intensiveness of the arbitration logic and the page management may pose a difficulty in meeting the logic requirements at a particular technology node (e.g., 90 nm). According to the Double Data Rate-2 (DDR2) DRAM specification standards defined by the JEDEC Solid-State Technology Association (hereinafter JEDEC), the maximum speed at which the DRAM memory clock may operate was 400 MHz, with a technology node of 90 nm fitting a certain number of logic levels within the 400 MHz. With the advent of the DDR3 DRAM specification defined by JEDEC, the maximum speed of operation of the DRAM memory clock changed to 800 MHz. This may afford very little width for timing closures. Therefore, the possibility of fitting all of the page management and arbitration into a single clock may be remote.

One way to overcome the abovementioned problem is to move to a technology node that may be faster than 90 nm (e.g., 65 nm, 45 nm, 40 nm). Even if the fast node were available, all the complex logic requirements may not fit into a single clock because of route delays being dominant. Another way is to pipeline commands over a number of clock cycles based on the timing requirements. This may compromise performance as latency may be increased.

SUMMARY

Disclosed are a method, an apparatus, and a system for reducing command latency and maintaining command bandwidth in a memory circuit.

In one aspect, a method includes operating, in a computing system, an arbitration logic of a memory controller at a core clock frequency lower than that of a memory clock frequency. The core clock frequency defines an operating frequency of a core of a memory controller configured to generate a command sequence that includes a number of commands in accordance with a number of external requests to access the memory. The memory clock frequency defines an operating frequency of the memory, and the arbitration logic is configured to resolve a contention between the number of external requests to share a command bus in order to access the memory.

The method also includes parallelizing, at the core clock frequency, the number of commands in the command sequence originating at the core clock frequency based on a timing requirement for a non-first command in the command sequence defined by a memory-access protocol being satisfied at a rising edge or a falling edge of the core clock relative to a previous command in the command sequence. Further, the method includes ensuring, through the parallelizing, availability of the number of commands in the command sequence to a memory interface operating at the memory clock frequency at a command rate equal to the memory clock frequency.

In another aspect, a method includes operating, in a computing system, an arbitration logic of a memory controller at a core clock frequency lower than that of a memory clock frequency. The core clock frequency defines an operating frequency of a core of the memory controller configured to generate a command in accordance with an external request to access the memory. The memory clock frequency defines an operating frequency of the memory, and the arbitration logic is configured to resolve a contention between a number of external requests to share a command bus in order to access the memory.

The method also includes sequencing the command originating at the core clock frequency to the memory clock frequency by directly synchronizing the command originating at the core clock frequency to the memory clock frequency at a same rising edge or a falling edge of the core clock or by pipelining the command originating at the core clock frequency at an intermediate stage operating at the core clock frequency prior to synchronizing the command to the memory clock frequency at the same rising edge or the falling edge of the core clock based on a phase generated along with the command originating at the core clock frequency.

The phase changes a state thereof based on a timing requirement for the command defined by a memory-access protocol being satisfied at the rising edge or the falling edge of the core clock, with an immediate previous command as a reference. The synchronization of the command originating at the core clock frequency to the memory clock frequency is enabled through a mask. The mask is a phase-shifted version of the core clock, and is synchronous to the memory clock.

In yet another aspect, a computing system includes a memory operating at a memory clock frequency, and a memory controller that includes an arbitration logic operating at a core clock frequency lower than that of the memory clock frequency. The core clock frequency defines an operating frequency of a core of the memory controller configured to generate a command sequence that includes a number of commands in accordance with a number of external requests to access the memory. The arbitration logic is configured to resolve a contention between the number of external requests to share a command bus in order to access the memory.

The number of commands in the command sequence originating at the core clock frequency are parallelized at the core clock frequency based on a timing requirement for a non-first command in the command sequence defined by a memory-access protocol being satisfied at a rising edge or a falling edge of the core clock relative to a previous command in the command sequence. Availability of the number of commands in the command sequence to a memory interface operating at the memory clock frequency is ensured at a command rate equal to the memory clock frequency through the parallelization.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system, and an apparatus for reducing command latency and maintaining command bandwidth in a memory circuit. Although the present embodiments have been described with reference to specific example embodiments, it will be evident that various modifications and changes may be made to these embodiments without departing from the broader spirit and scope of the various embodiments.

Figure 1:
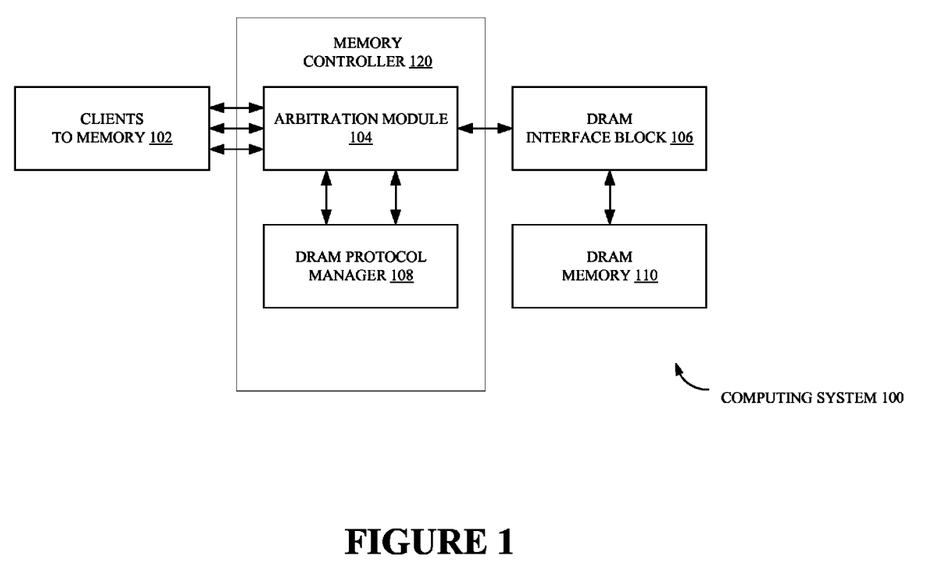
FIG. 1 is a computing system including a DRAM memory, according to one or more embodiments.

FIG. 1 shows a computing system 100 including a DRAM memory 110, according to one or more embodiments. In one or more embodiments, the computing system 100 may include clients to memory 102, which may require access to the DRAM memory 110. For example, clients to memory 102 may include central processors (e.g., Central Processing Unit (CPU)), Direct Memory Access (DMA) controllers and/or graphics processors. In one or more embodiments, an arbitration module 104 may be required to provide arbitration between multiple clients to memory 102. In one or more embodiments, a client to memory 102 may require a memory related operation to be performed (e.g., read/write operation or, indirectly, page activate and page close). In one or more embodiments, commands associated with the memory related operations may require tough arbitration logic in order to decide the order in which the commands have to be sent. In other words, the arbitration module 104 may choose the order in which requests from clients access the DRAM memory 110. In one or more embodiments, the arbitration logic in the arbitration module 104 may resolve a contention between a number of external requests from the clients to memory 102 to share a command bus in order to access the DRAM memory 110.

In one or more embodiments, the DRAM protocol manager 108, shown in FIG. 1 as interacting with the arbitration module 104, may include qualifiers for the multiple clients, protocol timers, and the ilk. In one or more embodiments, the DRAM protocol manager 108 may be updated by the arbitration module 104 as to a status of arbitration. In one or more embodiments, arbitration schemes may be round-robin or schemes based on Least Recently Used (LRU) algorithms. In one or more embodiments, the computing system 100 may also include a DRAM interface block 106 that interfaces with the DRAM memory 110. For example, the DRAM interface block 106 may include a command interface, an address interface, and a data interface, and may be logic intensive, i.e., include logic circuitry. In one or more embodiments, the DRAM memory 110 may be a memory array such as a Dual In-line Memory Module (DIMM), which includes a series of DRAM integrated circuits.

In FIG. 1, DRAM memory 110 is merely shown as an example, and the concepts involved in the exemplary embodiments discussed below may be applicable to any memory circuit that requires command synchronization and sequencing between different frequency domains. In one or more embodiments, the arbitration module 104 and the DRAM protocol manager 108 may be part of a memory controller 120. In one or more embodiments, the memory controller 120, which interfaces the clients to memory 102 to the DRAM memory 110, may be a part of a north-bridge chipset of the computing system 100. In one or more embodiments, buses may connect the clients to memory 102, the memory controller 120, and the DRAM memory 110. In one or more embodiments, the memory controller 120 may also include a command generator (not shown) that generates commands for the DRAM memory 110. In one or more embodiments, parameters may be defined for commands based on a DRAM specification. Therefore, in one or more embodiments, commands generated by the command generator may have the capability to handle different timings defined by a DRAM access protocol, which is governed by the DRAM protocol manager 108.

Figure 2:
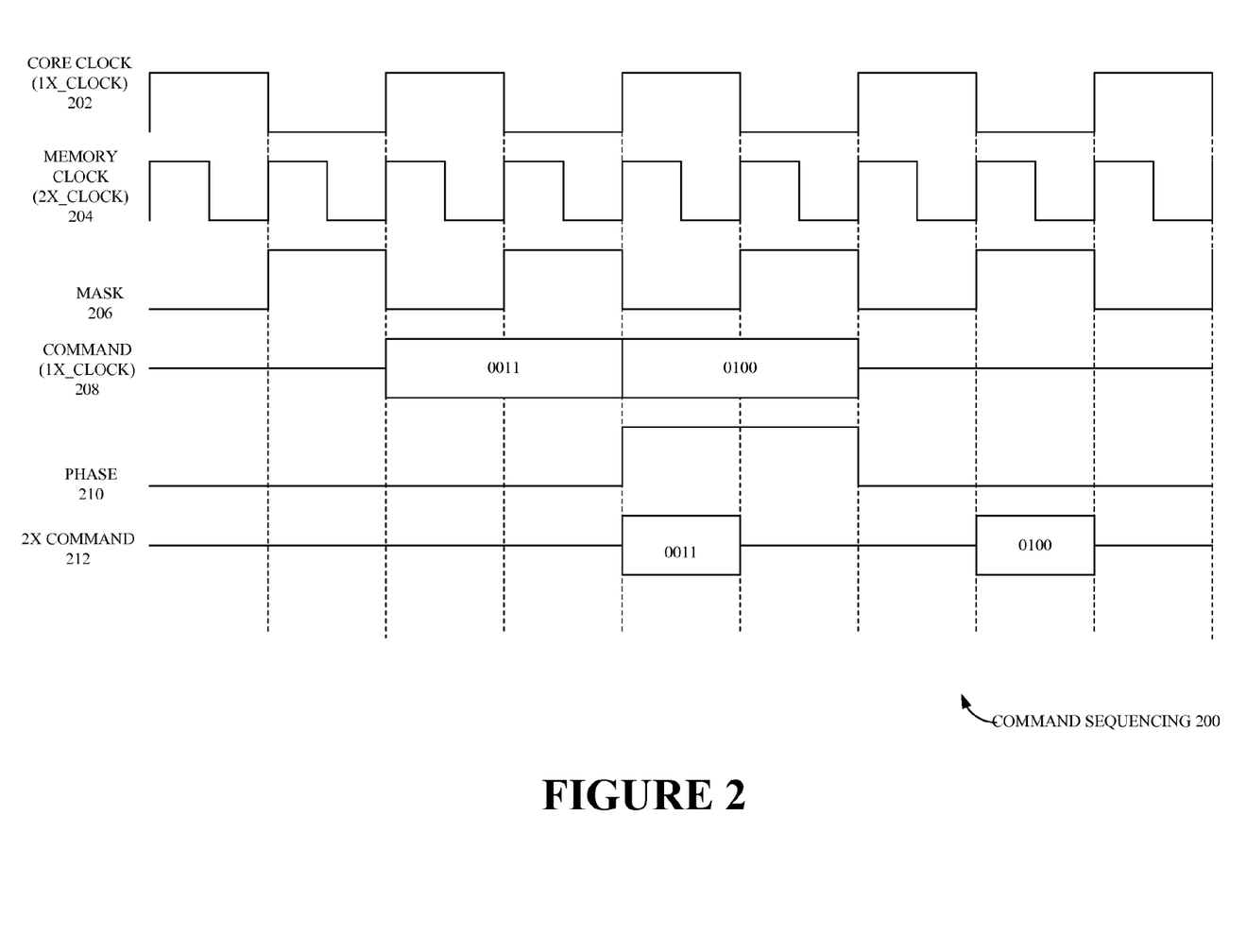
FIG. 2 is a plot of timing associated with a command sequencing and a command synchronization, according to one or more embodiments.

FIG. 2 shows a timing diagram associated with a command sequencing and a command synchronization, according to one or more embodiments. In one or more embodiments, a command 208 may be originated at the logic intensive core of the memory controller 120. In one or more embodiments, the logic intensive core of the memory controller 120 may be operated at a lower frequency compared to the frequency at which the DRAM memory 110 operates in order to satisfy the stringent timing requirements of the arbitration module 104 and the page management of the memory controller 120. In other words, the arbitration logic may be operated at a lower frequency compared to the DRAM memory 110 frequency. In one or more embodiments, DRAM memory 110 may also include an IO logic including IO buffers that operates at the same frequency as the DRAM memory 110, or, the core of the DRAM memory 110.

In one or more embodiments, in FIG. 2, the frequency at which the logic intensive core of the memory controller 120 operates is shown as core clock 202, which is represented as 1x_clock. In one or more embodiments, the frequency at which the IO logic of the DRAM memory 110 operates is shown in FIG. 2 as memory clock 204, which is represented as 2x_clock. 1x_clock may be equal to half the 2x_clock in frequency. Therefore, in FIG. 2, core clock 202 is half the memory clock 204 in frequency, in one or more embodiments.

Figure 3:
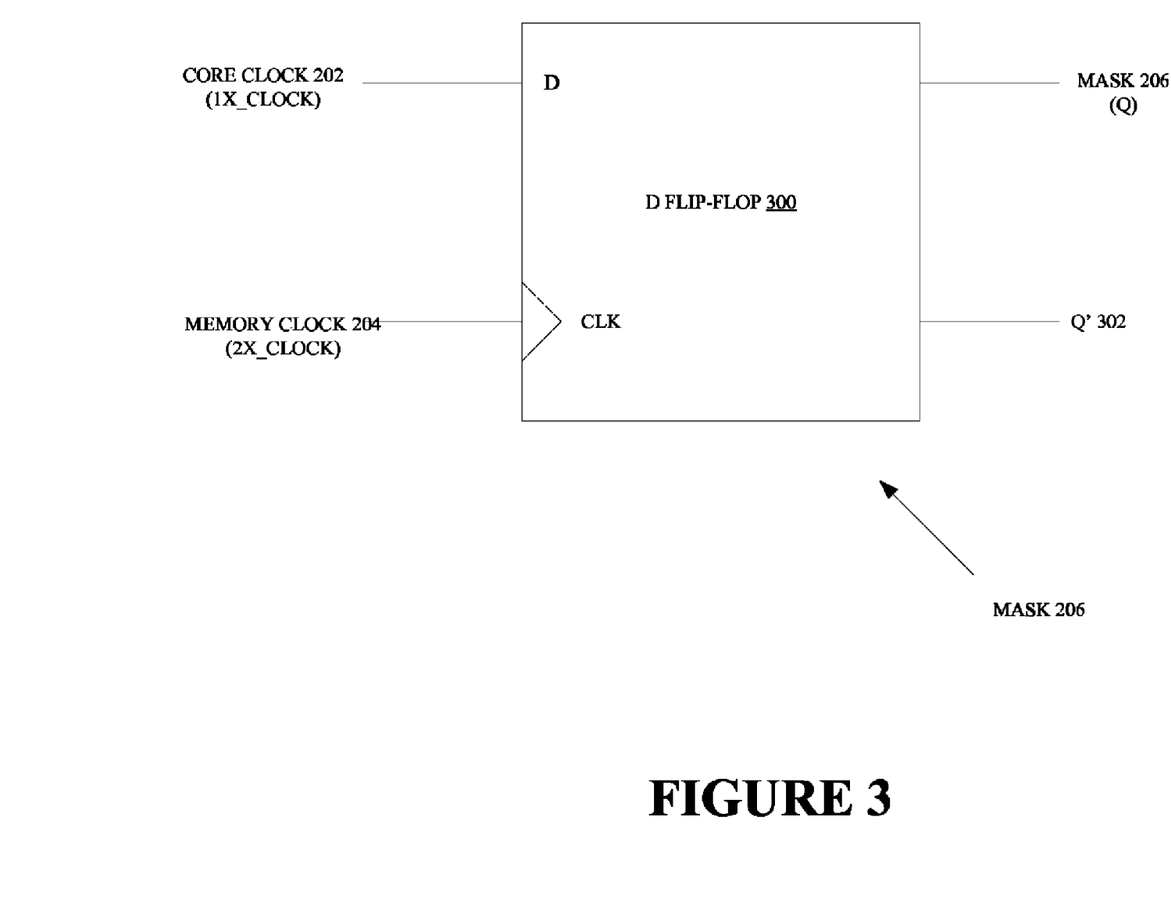
FIG. 3 is a schematic view of the generation of a mask using a D flip-flop, according to one or more embodiments.

In one or more embodiments, in order to enable synchronization of command 208 originating at 1x_clock to 2x_clock, a phase-shifted version of core clock 202 (referred to as mask 206 in FIG. 2) that is synchronous to memory clock 204 may be generated. In one or more embodiments, mask 206 may be a 180° phase-shifted version of core clock 202. In one or more embodiments, mask 206 may be generated using a divide-by-2 counter and phase-alignment logic. In one or more embodiments, mask 206 may be obtained by pipelining the 1x_clock and feeding the 1x_clock as data to the 2x_clock. Therefore, in one or more embodiments, the 1x_clock may be synchronized on the 2x_clock. FIG. 3 shows the generation of mask 206 using a D flip-flop 300, according to one or more embodiments. In one or more embodiments, the core clock 202 (1x_clock) may be provided as the data input (shown as D in FIG. 3) of the D flip-flop 300 and the memory clock 204 (2x_clock) may be provided as the clock input (CLK). In one or more embodiments, mask 206 may be the output (Q) of the D flip-flop 300, with Q' being complementary to Q.

In one or more embodiments, a command bus that interfaces the memory controller 120 with the DRAM interface block 106 may only carry one signal at a time. In one or more embodiments, command lines may include row address strobe (RAS), column address strobe (CAS), write enable (WE), and chip select (CS). In one or more embodiments, the combinations of high and low states of the aforementioned command lines may be encoded as command 208. For example, in FIG. 2, command 208 may include a ROW ACTIVATE command (shown as 0011) followed by a PRECHARGE command (shown as 0100).

In one or more embodiments, the command bus may issue only one command 208 at a time because issuing multiple commands at the same time results in contention between commands on the command bus. Here, contention may lead to the need for a command line to be simultaneously at a high state and a low state.

In one or more embodiments, a command 208 originated at 1x_clock may be placed on an IO bus based on a phase 210 used in conjunction with command 208. In one or more embodiments, timing constraints/parameters associated with command 208 may be defined by a DRAM-access protocol. In one or more embodiments, command 208, along with phase 210, may be originated at the same source (e.g., through a DMA request, a central processor (e.g., CPU) request, a GPU request, an expansion card request). In one or more embodiments, once a first command (e.g., 0011) of command 208 is sampled at the rising edge (or falling edge depending on the DRAM specification) of the core clock 202 (1x_clock) and made available to the DRAM interface block 106 at the memory clock 204 (2x_clock) rate to suit the DRAM memory 110 requirements, phase 210 may be utilized to indicate as to whether the next command (e.g., 0100) to be made available to the DRAM interface block 106 is to be sampled at the rising edge/falling edge of the core clock 202 (1x_clock).

In one or more embodiments, phase 210 may, therefore, be indicated as a logic low or a logic high, depending on whether command 208 is to be sampled at the rising edge of the core clock 202 (1x_clock) or the falling edge thereof. For example, as shown in FIG. 2, the logic low ("0") state of phase 210 may indicate a requirement of sampling a command at the rising edge of the core clock 202 (1x_clock) and the logic high ("1") of phase 210 may indicate a requirement of sampling the command at the falling edge of the core clock 202 (1x_clock).

In one or more embodiments, due to the logic low ("0") state of phase 210, the first command (0011) of command 208 may be placed on the IO bus at the next rising edge of the core clock 202 (1x_clock) such that the first command (0011) is available to the DRAM interface block 106 at rate of the memory clock 204, as shown in FIG. 2.

In one or more embodiments, commands at the IO rate may be denoted as 2x command 212, as shown in FIG. 2. Now, in one or more embodiments, as the logic state of phase 210 becomes high ("1"), the next command (0100) of command 208 may only be placed on the IO bus at the next falling edge of the core clock 202 (1x_clock), as shown in FIG. 2, and made available to the DRAM interface block 106 at the rate of memory clock 204. In one or more embodiments, were there no notion of phase 210, the next command (0100) of command 208 may be placed on the IO bus at the next rising edge of the core clock 202 (1x_clock), which is a 2x_clock early. However, in one or more embodiments, were there no notion of phase 210 (and mask 206, as will be discussed later) and were the core clock 202 merely operating at the slowed frequency of half of that of the memory clock 204, the second command (0100) of command 208 originating at the core clock 202 (1x_clock) frequency may not be placed immediately on the command bus as the timing requirements may not be met. Therefore, in one or more embodiments, the placement of the second command (0100) on the command bus may be delayed by one core clock 202 (1x_clock) cycle. Thus, in effect, the second command (0100) may be placed on the IO bus one 2x_clock late because of the absence of the notion of phase 210, in one or more embodiments. In one or more embodiments, the presence of phase 210 may contribute to an earlier placement (e.g., by one 2x_clock) of the second command (0100) on the IO bus, thereby reducing latency of the sequencing process.

As seen in the example above with regard to FIG. 2, in one or more embodiments, the reference for phase 210 may be the protocol timing requirements. In one or more embodiments, in a sequence of N (N>1) commands, the reference (i.e., phase 210) for placing the $N^{th}$ command on the command bus may be the $(N-1)^{th}$ command. Specifically, the reference for phase 210 defining the placement of the $N^{th}$ command may the meeting of the DRAM-access protocol timing requirements with respect to the $(N-1)^{th}$ command on the command bus. In one or more embodiments, phase 210 may be asserted based on whether the protocol timing requirements may be even or odd, i.e., depending on whether the $N^{th}$ command is to be launched at the next rising edge of the core clock 202 (1x_clock) with respect to the $(N-1)^{th}$ command or at the next falling edge of the core clock 202 (1x_clock) with respect to the $(N-1)^{th}$ command.

In one or more embodiments, there may be a prospective wait of M number of 1x_clock cycles (M≧1) for the launch of the $N^{th}$ command on the command bus following the launch of the $(N-1)^{th}$ command, when there is no notion of phase 210. In one or more embodiments, the launching of the $N^{th}$ command may be at the rising edge of the core clock 202 (1x_clock) or the falling edge of the core clock 202 (1x_clock), following the wait of M clock cycles. In one or more embodiments, the rising edge/falling edge launch and the M clock cycle wait may be vendor-based. In one or more embodiments, assuming that commands have to launched at the rising edge of the 1x_clock, and that the wait of an odd M number of 1x_clock cycles has ended, the $N^{th}$ command may not be launched immediately due to lack of "phase" information. In one or more embodiments, the $N^{th}$ command may have to be launched only at the next rising edge of the 1x_clock, following the completion of the wait of M clock cycles. In one or more embodiments, the $N^{th}$ command obviously may not be launched at the preceding rising edge of the 1x_clock cycle because then the DRAM-access protocol may be violated.

In one or more embodiments, therefore, there may be a penalty of an additional clock cycle when there is no notion of phase 210. In one or more embodiments, therefore phase 210 may be dynamic.

Figure 4:
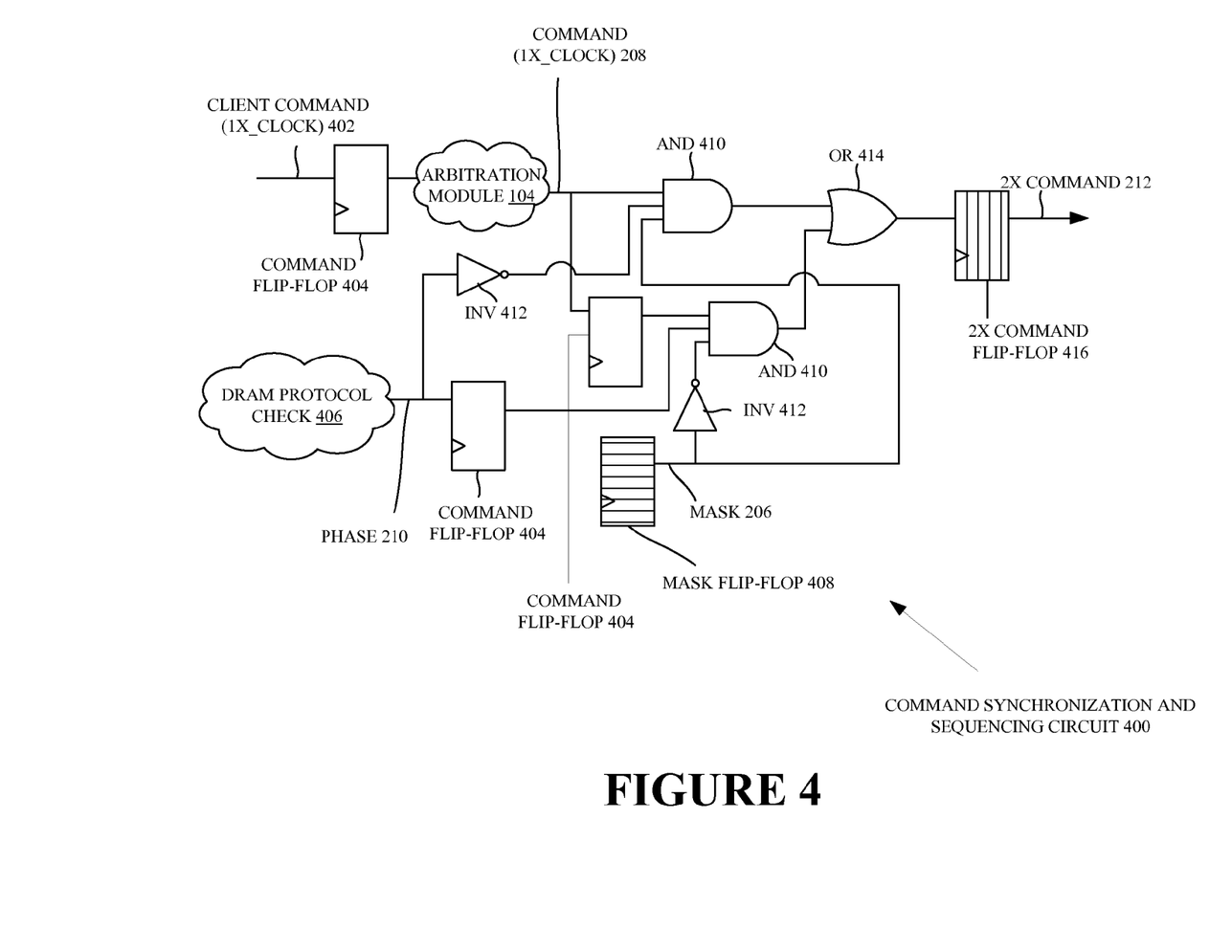
FIG. 4 is a schematic view of a command synchronization and sequencing circuit, according to one or more embodiments.

The importance of the mask 206 will be discussed below, in conjunction with the circuit used to accomplish command synchronization, i.e., transferring command 208 originating at the 1x_clock to a format recognizable by the DRAM memory 110. FIG. 4 shows a command synchronization and sequencing circuit 400, according to one or more embodiments. In one or more embodiments, the command synchronization and sequencing circuit 400 includes a command flip-flop 404 configured to receive a client command 402 originating at the core clock 202 (1x_clock) rate. In one or more embodiments, client command 402 may be generated at the command generator of the memory controller 120. In one or more embodiments, the source of client command 402 may be a DMA request, a central processor (e.g., CPU) request, a GPU request, an expansion card request etc.

In one or more embodiments, there may be a number of client command(s) 402 originating at the core clock 202 (1x_clock) rate configured to be input to the arbitration module 104. In one or more embodiments, the command 208 to be sequenced to the DRAM memory 110 is available at the output of the arbitration module 104. In one or more embodiments, in a typical north-bridge chipset, arbitration may occur among different streams, each of which may generate different types of DRAM commands (e.g., command 208, which may be ACTIVATE, PRECHARGE, READ/WRITE etc. or combinations thereof). In one or more embodiments, as arbitration may be logic intensive, arbitration occurs at the core clock 202 (1x_clock) rate, as discussed above. In one example embodiment shown in FIG. 4, command 208 at the output of the arbitration module 104 may include a ROW ACTIVATE command (shown as 0011 in FIG. 2) followed by a PRECHARGE command (shown as 0100 in FIG. 2).

In one or more embodiments, arbitration (e.g., command qualification) may be done based the DRAM timing specification defined by the DRAM-access protocol. In one or more embodiments, when the DRAM protocol timing checks (DRAM protocol check 406) controlled by the DRAM protocol manager 108 are satisfied at the rising edge of the core clock 202 (1x_clock), command (0011), i.e., output of the combinatorial arbitration, may be directly transferred to the memory clock 204 (2x_clock) domain. In one or more embodiments, in order to accomplish the synchronous transfer of command (0011) from the 1x_clock domain to the 2x_clock domain, a command synchronizer may be needed. In one or more embodiments, a minimal logic may be utilized in the form of an AND 410 gate, whose inputs are the phase 210 generated from DRAM protocol check 406, and mask 206 generated as the output of a mask flip-flop 408. In one or more embodiments, mask flip-flop 408 and command flip-flop 404 may be also be D flip-flops similar to the D flip-flop 300 utilized in the generation of mask 206, as shown in FIG. 3, with mask flip-flop 408 being analogous to the D flip-flop 300.

In one or more embodiments, phase 210 may be at a logic "0" state or a logic "1" state, as discussed above with regard to FIG. 2. In one or more embodiments, in the above case of direct transfer of command (0011) from the 1x_clock domain to the 2x_clock domain, the logic "0" state of phase 210 may be obtained by inverting the output of DRAM protocol check 406 (e.g., using inverter logic INV 412). In one or more embodiments, when the mask 206 may be at a logic high ("1"), the synchronization to the 2x_clock domain may be complete. Therefore, in one or more embodiments, the mask 206 may enable AND 410 gate, leading to the transfer of command (0011) to the 2x command flip-flop 416, whose output (2x command 212) may be placed on the IO bus, which is functional at the memory clock 204 (2x_clock) rate. In one or more embodiments, 2x command flip-flop 416, like command flip-flop 404 and mask flip-flop 408, may be a D flip-flop.

In one or more embodiments, the direct transfer of command (0011) from the 1x_clock domain to the 2x_clock domain may lead to metastability in the 2x command flip-flop 416 during the odd 2x_clock cycle (or second half of the 2x_clock cycle) as the data/control input of the 2x command flip-flop 416 may be transitioning at the instant of the 2x_clock pulse. In one or more embodiments, therefore, mask 206 may be utilized to mask the falling edge of memory clock 204 (2x_clock) such that the data/control input of the 2x command flip-flop 416 is held valid before and after the instant of the 2x_clock pulse. In one or more embodiments, the abovementioned direct transfer of command (0011) from the 1x_clock domain to the 2x_clock domain may provide for a timing budget of two 2x_clock cycles, as shown in FIG. 2. In one or more embodiments, thus, complex arbitration logic may be accommodated.

In one or more embodiments, when DRAM protocol timing checks (DRAM protocol check 406) are satisfied at the falling edge of the core clock 202 (1x_clock), the output of arbitration module 104 may be transferred (i.e., pipelined) to an intermediate holding stage. In the example embodiment of FIG. 4, command (0100) originating at the core clock 202 (1x_clock) domain may have a phase 210 logic "1" state, with reference to the previous command (0011), as discussed above with regard to FIG. 2. In one or more embodiments, the output of the holding stage (e.g., another command flip-flop 404) may be input to another AND 410 gate. In one or more embodiments, phase 210 (logic "1") may be input to AND 410 gate configured to receive the output of the holding stage, after being "held" at another command flip-flop 404. Now, in one or more embodiments, as the rising edge of the memory clock 204 (2x_clock) may be masked, mask 206 may be inverted (INV 412) and input to AND 410 gate configured to receive the output of the holding stage.

In one or more embodiments, command (0100) may then be transferred as the output of the holding stage (e.g., command flip-flop 404) at the core clock 202 (1x_clock) rate to the 2x command flip-flop 416, whose output (2x command 212) may be placed on the IO bus, which is functional at the 2x_clock rate. In one or more embodiments, the transfer of command (0100) from the holding stage to the 2x_clock domain may provide for a timing budget of one 2x_clock cycle, as demonstrated in FIG. 2.

In one or more embodiments, OR gate 414 may receive outputs from the 1x_domain to be synchronized to the 2x_domain. In one or more embodiments, phase 210 may determine as to whether the command 208 originating at the 1x_clock domain is qualified to be directly synchronized to the 2x_clock domain or is to be pipelined at an intermediate holding stage (e.g., command flip-flop 404). In one or more embodiments, mask 206 may enable a particular command (e.g., command 208) to be synchronized based on phase 210.

Therefore, in one or more embodiments, having constituents of a command sequence in parallel stages may provide for efficient and "intelligent" command sequencing on the IO bus by increasing the availability of commands to the DRAM interface block 106.

In one or more embodiments, were the core logic of the memory controller 120 merely slowed to half the memory clock 204 frequency and the command rate ensured to be at the same frequency (i.e., half of the memory clock 204), the command bandwidth may be reduced by two. In one or more embodiments, the entire frequency range of the DRAM memory 110, therefore, may not be completely utilized.

In one or more embodiments, as discussed above, by operating the arbitration logic in the arbitration module 104 at a slower frequency compared to the DRAM memory 110 and pipelining commands to be available in parallel to the DRAM interface block 106, the command bandwidth may be maintained. Specifically, in the exemplary embodiments described above, operating the arbitration logic in the arbitration module 104 at half the DRAM frequency (i.e., memory clock 204) whilst simultaneously pipelining the commands based on phase 210, and ensuring availability of the commands at the memory clock 204 rate (e.g., 800 MHz in the case of DDR3 DRAM, which may be twice the core clock 202 rate of 400 MHz) may provide for improved performance and bandwidth maintenance.

In one or more embodiments, as the command synchronization from the 1x_clock domain to the 2x_clock domain, i.e., command transfer from the 1x_clock domain to the 2x_clock domain, occurs at the same rising edge or falling edge of the 1x_clock, command synchronization latency may be reduced. Moreover, as phase 210 is utilized to impart "intelligence" in command availability, and the synchronization logic utilized in FIG. 4 is minimal (e.g., AND gate 410), command latency is further reduced.

Figure 5:
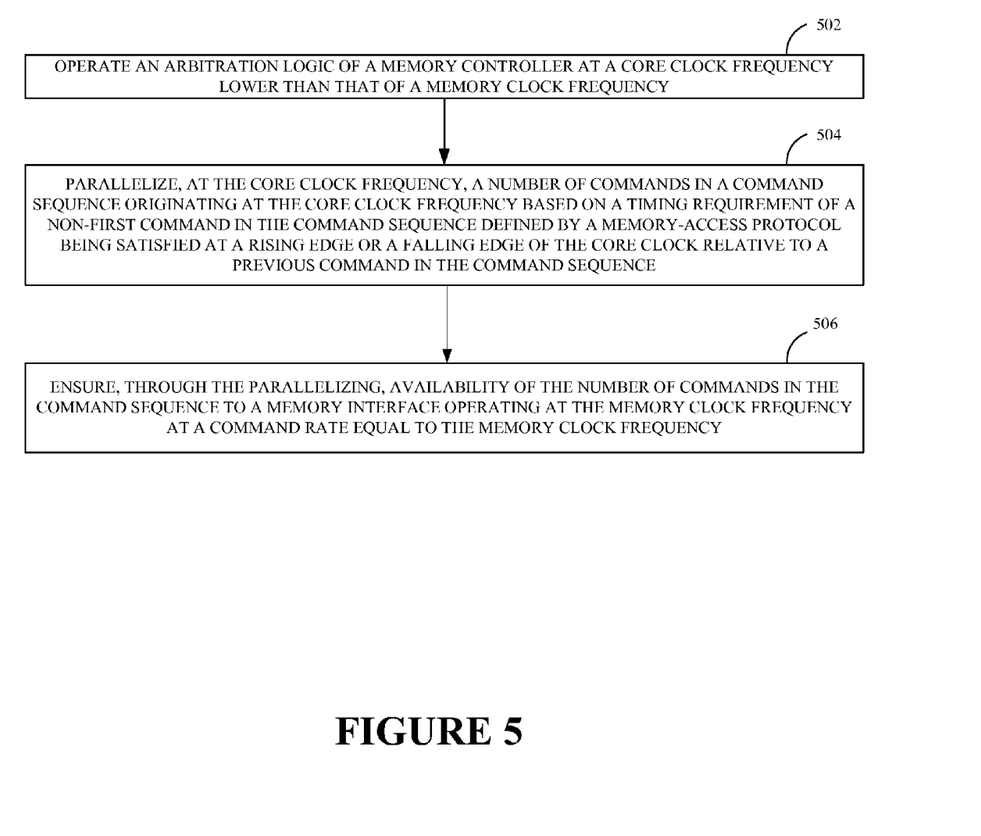
FIG. 5 is a process flow diagram detailing the operations involved in command bandwidth maintenance, according to one or more embodiments.

FIG. 5 is a process flow diagram detailing the operations involved in command bandwidth maintenance, according to one or more embodiments. In one or more embodiments, operation 502 may involve operating an arbitration logic of a memory controller 120 at a core clock 202 frequency lower than that of a memory clock 204 frequency. In one or more embodiments, the core clock 202 frequency may define an operating frequency of the core of the memory controller 120 configured to generate a command sequence comprising a number of commands in accordance with a number of external requests to access the memory. In one or more embodiments, the memory clock 204 frequency may define an operating frequency of the memory. In one or more embodiments, the arbitration logic may be configured to resolve a contention between the number of external requests to share a command bus in order to access the memory.

In one or more embodiments, operation 504 may involve parallelizing, at the core clock 202 frequency, the number of commands in the command sequence originating at the core clock 202 frequency based on a timing requirement of a non-first command in the command sequence defined by a memory-access protocol being satisfied at a rising edge or a falling edge of the core clock 202 relative to a previous command in the command sequence. In one or more embodiments, operation 506 may involve ensuring, through the parallelizing, availability of the number of commands in the command sequence to a memory interface operating at the memory clock frequency at a command rate equal to the memory clock frequency.

Figure 6:
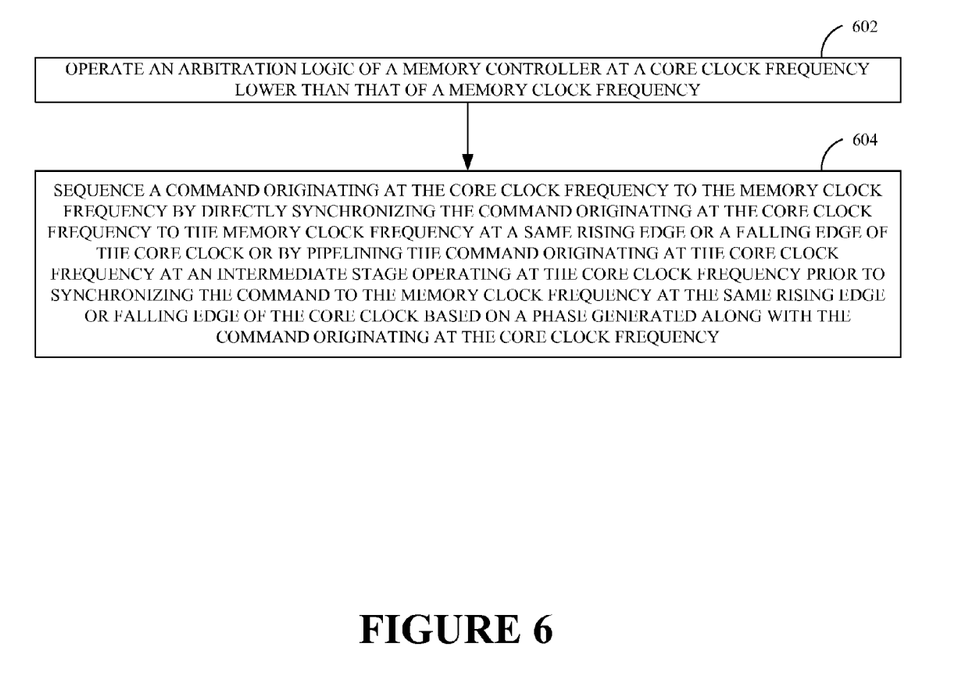
FIG. 6 is a process flow diagram detailing the operations involved in a command sequencing and synchronization process, according to one or more embodiments.

FIG. 6 is a process flow diagram detailing the operations involved in a command sequencing and synchronization process, according to one or more embodiments. In one or more embodiments, operation 602 may involve operating an arbitration logic of a memory controller 120 at a core clock 202 frequency lower than that of a memory clock 204 frequency. In one or more embodiments, the core clock 202 frequency may define an operating frequency of the core of the memory controller 120 configured to generate a command in accordance with an external request to access the memory. In one or more embodiments, the memory clock 204 frequency may define an operating frequency of the memory. In one or more embodiments, the arbitration logic may be configured to resolve a contention between a number of external requests to share a command bus in order to access the memory.

In one or more embodiments, operation 604 may involve sequencing a command 208 originating at the core clock 202 frequency to the memory clock 204 frequency by directly synchronizing the command 208 originating at the core clock 202 frequency to the memory clock 204 frequency at a same rising edge or a falling edge of the core clock 202 or by pipelining the command 208 originating at the core clock 202 frequency at an intermediate stage operating at the core clock 202 frequency prior to synchronizing the command 208 to the memory clock 204 frequency based on a phase 210 generated along with the command 208 originating at the core clock 202 frequency.

In one or more embodiments, the phase 210 may change a state thereof based on a timing requirement for the command 208 defined by a memory-access protocol being satisfied at the rising edge or the falling edge of the core clock 202, with an immediate previous command as a reference. In one or more embodiments, the synchronization of the command 208 originating at the core clock 202 frequency to the memory clock 204 frequency may be enabled through a mask 206. In one or more embodiments, the mask 206 may be a phase-shifted version of the core clock 202. In one or more embodiments, the mask 206 may be synchronous to the memory clock 204.

Although the present embodiments have been described with reference to specific example embodiments, it will be evident that various modifications and changes may be made to these embodiments without departing from the broader spirit and scope of the various embodiments. For example, the synchronization logic in FIG. 4, the mask 206 implementation and/or the ratio of the core clock 202 frequency to the memory clock 204 frequency may be varied. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method comprising:
   operating, in a computing system, an arbitration logic of a memory controller at a core clock frequency lower than that of a memory clock frequency, the core clock frequency defining operating frequency of a core of the memory controller configured to generate a command sequence comprising a plurality of commands in accordance with a plurality of external requests to access a memory, the memory clock frequency defining operating frequency of the memory, and the arbitration logic being configured to resolve a contention between the plurality of external requests to share a command bus in order to access the memory;

parallelizing, at the core clock frequency, the plurality of commands in the command sequence originating at the core clock frequency based on a timing requirement for a non-first command in the command sequence defined by a memory-access protocol being satisfied at one of a rising edge and a falling edge of the core clock relative to a previous command in the command sequence; and ensuring, through the parallelizing, availability of the plurality of commands in the command sequence to a memory interface operating at the memory clock frequency at a command rate equal to the memory clock frequency.

2. The method of claim 1, comprising operating the arbitration logic of the memory controller at the core clock frequency equal to half of the memory clock frequency.

3. The method of claim 1, wherein the memory is a Dynamic Random Access Memory (DRAM).

4. The method of claim 1, wherein parallelizing the plurality of commands in the command sequence originating at the core clock frequency and ensuring availability of the plurality of commands in the command sequence to the memory interface operating at the memory clock frequency at the command rate equal to memory clock frequency includes:

sequencing the plurality of commands in the command sequence originating at the core clock frequency to the memory clock frequency by one of:

directly synchronizing one of a first command and the non-first command in the command sequence originating at the core clock frequency to the memory clock frequency at a same one of the rising edge and the falling edge of the core clock, and pipelining the non-first command in the command sequence originating at the core clock frequency at an intermediate stage operating at the core clock frequency prior to synchronizing the non-first command in the command sequence to the memory clock frequency at the same one of the rising edge and the falling edge of the core clock based on the timing requirement for the non-first command in the command sequence defined by the memory-access protocol being satisfied at one of the rising edge and the falling edge of the core clock relative to the previous command in the command sequence.

5. The method of claim 1, wherein the plurality of external requests to access the memory includes at least one of a central processor request, a Direct Memory Access (DMA) request, a Graphics Processing Unit (GPU) request, and an expansion card request.

6. The method of claim 4, further comprising enabling the synchronization of the plurality of commands in the command sequence originating at the core clock frequency to the memory clock frequency through a mask synchronous to the memory clock, the mask being a phase-shifted version of the core clock.

7. The method of claim 4, wherein the intermediate stage is a flip-flop.

8. The method of claim 4, further comprising generating the timing requirement for the non-first command in the command sequence at the core clock frequency along with the non-first command based on an external request in the plurality of external requests to access the memory and a memory specification.

9. The method of claim 6, wherein the mask is a 180° phase-shifted version of the core clock.

10. The method of claim 6, further comprising generating the mask from a D-flip-flop having the core clock as a data input thereof and the memory clock as a clock input thereof.

11. The method of claim 6, further comprising masking, through the mask, one of a falling edge and a rising edge of the memory clock around a command in the command sequence based on whether a memory-access protocol check associated with the timing requirement of the command relative to the previous command is satisfied at a corresponding other of the rising edge and the falling edge of the core clock.

12. A method comprising:

operating, in a computing system, an arbitration logic of a memory controller at a core clock frequency lower than that of a memory clock frequency, the core clock frequency defining operating frequency of a core of the memory controller configured to generate a command in accordance with an external request to access a memory, the memory clock frequency defining operating frequency of the memory, and the arbitration logic being configured to resolve a contention between a plurality of external requests to share a command bus in order to access the memory; and sequencing the command originating at the core clock frequency to the memory clock frequency by one of:

directly synchronizing the command originating at the core clock frequency to the memory clock frequency at a same one of a rising edge and a falling edge of the core clock, and pipelining the command originating at the core clock frequency at an intermediate stage operating at the core clock frequency prior to synchronizing the command to the memory clock frequency at the same one of the rising edge and the falling edge of the core clock based on a phase generated along with the command originating at the core clock frequency, the phase changing a state thereof based on a timing requirement for the command defined by a memory-access protocol being satisfied at one of the rising edge and the falling edge of the core clock, with an immediate previous command as a reference, and the synchronization of the command originating at the core clock frequency to the memory clock frequency being enabled through a mask, wherein the mask is a phase-shifted version of the core clock, and wherein the mask is synchronous to the memory clock.

13. The method of claim 12, comprising operating the arbitration logic of the memory controller at the core clock frequency equal to half of the memory clock frequency.

14. The method of claim 12, wherein the external request to access the memory includes at least one of a central processor request, a Direct Memory Access (DMA) request, a Graphics Processing Unit (GPU) request, and an expansion card request.

15. The method of claim 12, further comprising generating the timing requirement for the command at the core clock frequency along with the command based on the external request to access the memory and a memory specification.

16. The method of claim 12, further comprising generating the mask from a D-flip-flop having the core clock as a data input thereof and the memory clock as a clock input thereof.

17. The method of claim 12, further comprising masking, through the mask, one of a falling edge and a rising edge of the memory clock around the command based on whether a memory-access protocol check associated with the timing requirement of the command relative to the previous command is satisfied at a corresponding other of the rising edge and the falling edge of the core clock.

18. A computing system comprising:

a memory operating at a memory clock frequency; and a memory controller comprising an arbitration logic operating at a core clock frequency lower than that of the memory clock frequency, the core clock frequency defining operating frequency of a core of the memory controller configured to generate a command sequence comprising a plurality of commands in accordance with a plurality of external requests to access the memory, and the arbitration logic being configured to resolve a contention between the plurality of external requests to share a command bus in order to access the memory, wherein the plurality of commands in the command sequence originating at the core clock frequency is parallelized at the core clock frequency based on a timing requirement for a non-first command in the command sequence defined by a memory-access protocol being satisfied at one of a rising edge and a falling edge of the core clock relative to a previous command in the command sequence, and wherein availability of the plurality of commands in the command sequence to a memory interface operating at the memory clock frequency is ensured at a command rate equal to the memory clock frequency through the parallelization.

19. The computing system of claim 18, wherein the memory is a Dynamic Random Access Memory (DRAM).

20. The computing system of claim 18, wherein the plurality of external requests to access the memory includes at least one of a central processor request, a Direct Memory Access (DMA) request, a Graphics Processing Unit (GPU) request, and an expansion card request.

* * * * *